US005423615A

United States Patent [19]
Hara et al.

[11] Patent Number: 5,423,615
[45] Date of Patent: Jun. 13, 1995

[54] CROSS ROLLER BEARING

[75] Inventors: Takehiko Hara, Kanagawa; Ichiro Masuda, Hyogo, both of Japan

[73] Assignee: Nippon Thompson Co., Ltd., Tokyo, Japan

[21] Appl. No.: 134,589

[22] Filed: Oct. 12, 1993

[30] Foreign Application Priority Data

Oct. 14, 1992 [JP] Japan .............................. 4-077805 U
Feb. 25, 1993 [JP] Japan .............................. 5-012665 U

[51] Int. Cl.⁶ .............................................. F16C 33/64
[52] U.S. Cl. ..................................... 384/503; 384/537; 384/559
[58] Field of Search ............... 384/503, 502, 499, 510, 384/447, 537, 539, 559, 570, 584, 569, 507, 508, 560

[56] References Cited

U.S. PATENT DOCUMENTS

| | | | |
|---|---|---|---|
| 1,197,373 | 9/1916 | Hirth | 384/502 |
| 1,675,728 | 7/1928 | Pierce, Jr. | 384/570 |
| 2,648,578 | 8/1953 | Stearns et al. | 384/503 |
| 3,302,987 | 2/1967 | Hoffmann et al. | 384/569 |
| 3,592,519 | 7/1971 | Martin | 384/503 |
| 5,033,873 | 7/1991 | Suzuki | 384/447 |

FOREIGN PATENT DOCUMENTS 2042722 3/1979 Germany ........................... 384/570
62-292919 12/1987 Japan .

Primary Examiner—Thomas R. Hannon
Attorney, Agent, or Firm—Sughrue, Mion, Zinn, Macpeak & Seas; Richard C. Turner; Steven M. Gruskin

[57] ABSTRACT

A cross roller bearing is disclosed that achieves a long service life by reducing the effects of split surfaces formed in an outer ring in the direction that crosses a V-shaped groove of said outer ring. In addition, a cross roller bearing is disclosed that allows said effects to be reduced at low cost.

The above-mentioned advantages are obtained by forming a recess in the outer surface of said outer ring corresponding to said split surfaces to reduce the preliminary pressure applied to rollers at that portion.

In addition, the above-mentioned advantages are achieved at low cost by the filling of a filling member and the setting of the angle at which said split surfaces cross said V-shaped groove.

7 Claims, 9 Drawing Sheets

CROSS ROLLER BEARING

BACKGROUND OF THE INVENTION

1. Field of the Invention

The present invention relates to a cross roller bearing, and more particularly, to a cross roller bearing wherein split surfaces in the direction that crosses the V-shaped groove of an outer ring are formed in that outer ring.

2. Description of the Prior Art

An example of this type of cross roller bearing is shown in FIGS. 1 through 4. Furthermore, said cross roller bearing is disclosed in, for example, Japanese Patent Publication Laid-Open No. 62-292919.

As shown in the drawings, said cross roller bearing has outer ring 1 and inner ring 2 each formed into the shape of a ring. V-shaped groove 1a, opening towards the inside, is formed along the circumferential direction in the inner surface of outer ring 1, and V-shaped groove 2a, opening towards the outside, is formed along the circumferential direction in the outer surface of inner ring 2. Outer ring 1 and inner ring 2 are assembled juxtapositioning a plurality of rollers 3 between each of said V-shaped grooves 1a and 2a.

Furthermore, each roller 3 is composed of a cylindrical or spherical roller. As is clear from FIG. 3, rollers 3 are alternately positioned so that the axes of rotation of adjacent rollers cross. In addition, as shown in said drawing, separators 4 are juxtapositioned between each roller 3.

As shown in FIGS. 1 and 4, split surfaces 1b in the direction that crosses V-shaped groove 1a of outer ring 1, and in this case, orthogonal to said V-shaped groove 1a, are formed at one location of said outer ring 1. These split surfaces 1b spread open outer ring 1 at that portion as shown with arrow D in FIG. 4, and are for inserting rollers 3 and separators 4 within the gap formed between inner roller 1 and outer roller 2.

As a result of this constitution in which outer ring 1 is split at one location in the direction that crosses its V-shaped groove 1a, V-shaped groove 1a of outer ring 1 can be machined with a high degree of precision. Thus, the relative rotational movement of the inner and outer rings performed by means of rollers 3 is performed both smoothly and with high precision. Furthermore, since the above-mentioned split surfaces 1b are formed by breaking, split surfaces 1b completely coincide with each other when said cross roller bearing is incorporated into the revolving portion of a machine and so forth, thus ensuring roundness. In addition, outer ring 1 having this type of constitution is referred to as a single split outer ring.

Despite this, in the cross roller bearing having the constitution as claimed, if even a minute gap forms between the above-mentioned split surfaces 1b, and the load is large, the rotating speed is high or said bearing is used for an extended period of time, this gap accelerates the wear of rollers 3, thus resulting in the disadvantage of greatly impairing a smooth rotating state.

Furthermore, in order to solve this problem, various coupling devices have been proposed to couple those adjacent portions split by split surfaces 1b in order to minimize the above-mentioned gap. However, since the constitutions of these coupling devices are relatively complex, said coupling devices are not always preferable in the case of attempting to reduce the manufacturing cost of the bearing.

SUMMARY OF THE INVENTION

Therefore, in consideration of the above-mentioned disadvantages of the prior art, the object of the present invention is to provide a cross roller bearing that achieves a long service life by reducing the effects of split surfaces formed in an outer ring. In addition, a second object of the present invention is to reduce said effects at low cost.

The present invention composes a cross roller bearing comprising: the assembling of an outer ring, in which a V-shaped groove opening towards the inside is formed along the circumferential direction in the inner surface, and split surfaces in the direction that crosses said V-shaped groove are provided at one location; and an inner ring, in which a V-shaped groove opening towards the outside is formed along the circumferential direction in the outer surface; by juxtapositioning a plurality of rollers between said V-shaped grooves so that the axes of rotation of adjacent rollers cross; wherein, a recess is formed in the outer surface of said outer ring that corresponds to said split; surfaces.

In addition, the present invention composes a cross roller bearing comprising: the assembling of an outer ring, in which a V-shaped groove opening towards the inside is formed along the circumferential direction in the inner surface, and split surfaces in the direction that crosses said V-shaped groove are provided at one location; and an inner ring, in which a V-shaped groove opening towards the outside is formed along the circumferential direction in the outer surface; by juxtapositioning a plurality of rollers between said V-shaped grooves so that the axes of rotation of adjacent rollers cross; wherein, the portions split by said split surfaces are coupled by a filling member at one location over the width of said split surfaces.

In addition, the present invention composes a cross roller bearing comprising: the assembling of an outer ring, in which a V-shaped groove opening towards the inside is formed along the circumferential direction in the inner surface, and split surfaces in the direction that crosses said V-shaped groove are provided at one location; and an inner ring, in which a V-shaped groove opening towards the outside is formed along the circumferential direction in the outer surface; by juxtapositioning a plurality of rollers between said V-shaped grooves so that the axes of rotation of adjacent rollers cross; wherein, said split surfaces are formed to cross at a prescribed angle with respect to a direction perpendicular to said V-shaped grooves.

DESCRIPTION OF THE PREFERRED EMBODIMENTS

Figure 1:
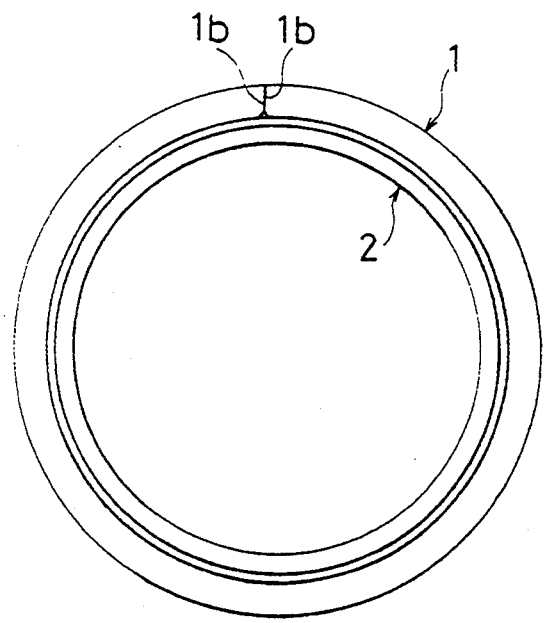
FIG. 1 is a front view of a cross roller bearing of the prior art.
Figure 2:
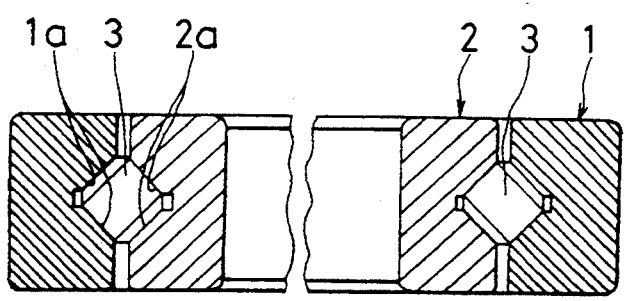
FIG. 2 is a vertical cross-sectional view of the cross roller bearing shown in FIG. 1.

The following provides explanations of embodiments of the cross roller bearing of the present invention with reference to the attached drawings. Furthermore, since the cross roller bearing claimed in the present invention is composed in a similar manner to the cross roller bearing of the prior art shown in FIGS. 1 through 4 with the exception of the portions explained below, only an explanation of the essential portion is provided while omitting an explanation of the entire cross roller bearing. In addition, in the following explanation, the same reference numerals are used for those constituent members that are identical to the constituent members of said cross roller bearing of the prior art.

Figure 5:
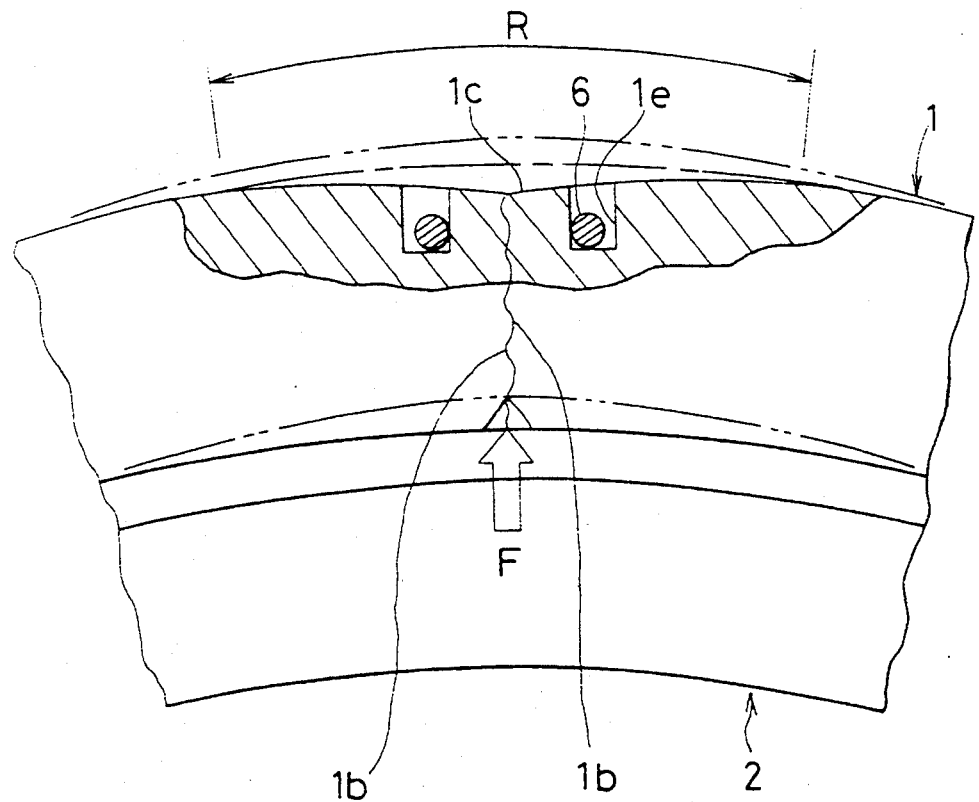
FIG. 5 is a front view, including a partial cross-section, of the essential portion of a cross roller bearing as a first embodiment of the present invention.
Figure 6A:
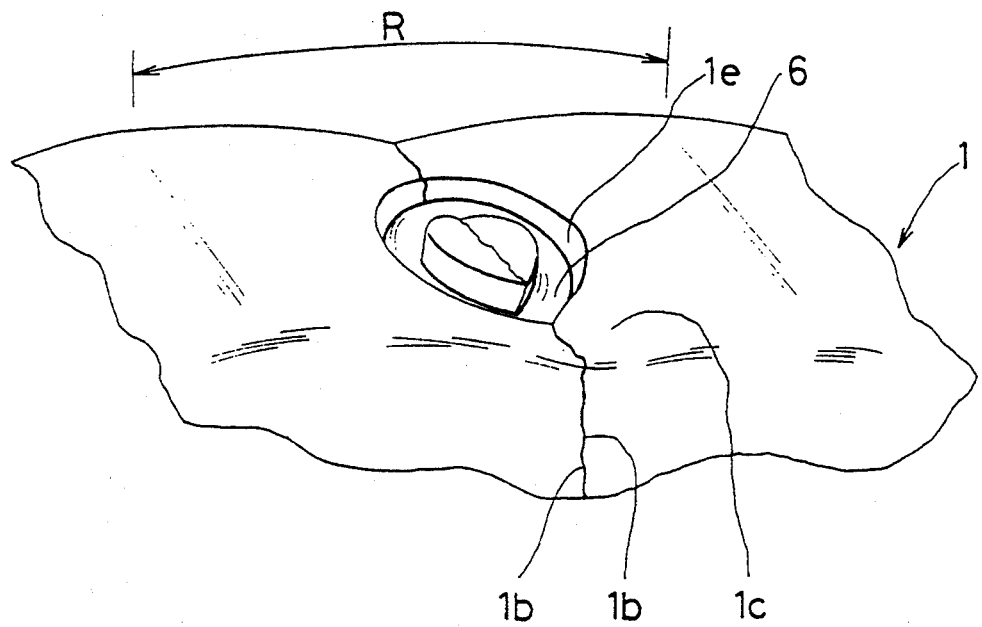
FIG. 6a is a perspective view of the essential portion shown in FIG. 5.
Figure 6B:
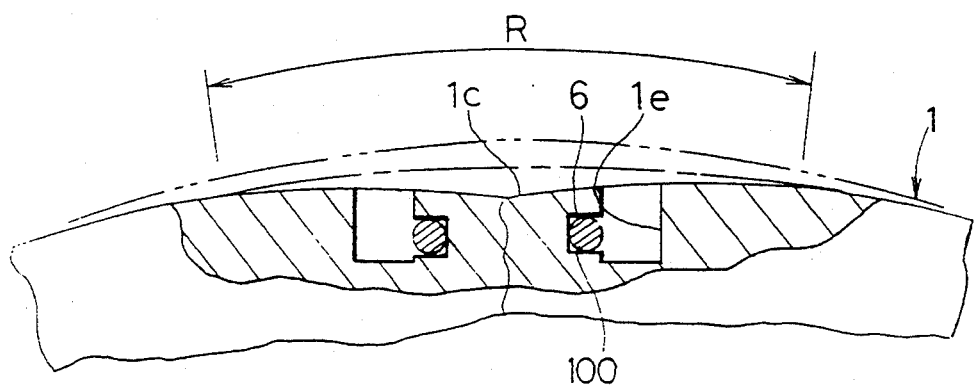
FIG. 6b is a perspective view of a modification to the essential portion.

FIGS. 5, 6a and 6b show a first embodiment of the cross roller bearing of the present invention. As shown in the, drawings, in said cross roller bearing, recess 1c is formed in the outer surface of a single split outer ring (to be simply referred to as an outer ring) 1 corresponding to its split surfaces 1b. More specifically, this recess 1c is formed over a prescribed range R in the circumferential direction roughly over the entire width of the outer surface of outer ring 1 and centered around split surfaces 1b. Said recess 1c is also formed so as to gradually become deeper towards split surfaces 1b in said circumferential direction.

As described above, as a result of recess 1c being formed corresponding to split surfaces 1b, the preliminary pressure applied to rollers 3 (refer to FIGS. 2 and 3) between outer ring 1 and inner ring 2 is reduced at the portion at which this recess 1c is formed in comparison with other portions. Together with this suppressing the wearing of rollers 3 originating in the gap that forms between said split surfaces 1b, it also lengthens the service life of the bearing by allowing rollers 3 to roll smoothly.

However, a coupling device that couples together the portions split by split surfaces 1b is provided on the outer surface of the above-mentioned outer ring 1. Said coupling device is composed in the manner described below.

As shown in FIGS. 5 and 6a, this coupling device is composed of ring-shaped groove 1e, formed in the outer surface of outer ring 1 so that split surfaces 1b are positioned in the center of the ring, and coupling member 6, formed into the shape of a ring from spring steel and so forth that fits into said groove 1e. Furthermore, coupling member 6 is not limited to that having a circular cross-section as shown in the drawings, but rather, that having a rectangular cross-section or a commercially available retaining ring may also be used. In addition, with respect to the manner by which coupling member 6 fits into groove 1e, in addition to employing a constitution wherein the inner surface of coupling member 6 is brought in contact with the inner wall surface of said groove 1e, a constitution may also be employed wherein the outer surface of coupling member 6 is brought in contact with the outer wall surface of groove 1e, or wherein both the inner and outer surfaces of coupling member 6 are tightly brought in contact with the inner and outer wall surfaces of a groove. Moreover, a modified constitution may also be employed wherein a ring-shaped groove (not shown) 100 (FIG. 6b) depressed in the radial direction of groove 1e is formed in the inner wall surface or outer wall surface of said groove 1e to prevent coupling member 6 from coming out. In said constitution, after resiliently deforming coupling member 6 and inserting it into groove 1e by either expanding or contracting its diameter, that force is removed to allow said coupling member 6 to return to its original diameter and fit into this ring-shaped groove.

The following provides an explanation of the manufacturing process for a bearing containing the process for forming recess 1c of outer ring 1 described above.

Firstly, outer ring 1 and inner ring 2 are obtained in which unground V-shaped grooves 1a and 2a are respectively provided. The prescribed heat treatment is then performed after carrying out the respective machining processes. Furthermore, with respect to outer ring 1, groove 1e shown in FIGS. 5, 6a and 6b is formed before performing heat treatment. Grinding is then performed on the outer surface of outer ring 1, inner surface of inner ring 2 and the above-mentioned V-shaped grooves 1a and 2a. Split surfaces 1b are then formed in outer-ring 1. However, outer ring 1 and inner ring 2 are each ground separately. When performing grinding of the outer surface of outer ring 1, external force F is applied from the inside to the outside at the site corresponding to split surfaces 1b as shown in FIG. 5. When done in this manner, this site swells from the normal state shown with the single dot broken line to the state shown with the double dot broken line, thus resulting in excessive grinding at this site in comparison with other portions. If this external force F is removed after completion of grinding, recess 1c is formed as shown in FIGS. 5, 6a and 6b.

Figure 3:
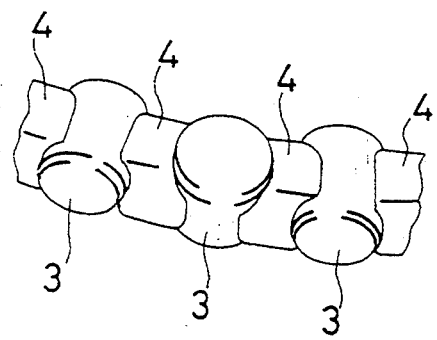
FIG. 3 is a perspective view of the rollers and separators equipped in the cross roller bearing shown in FIGS. 1 and 2.
Figure 4:
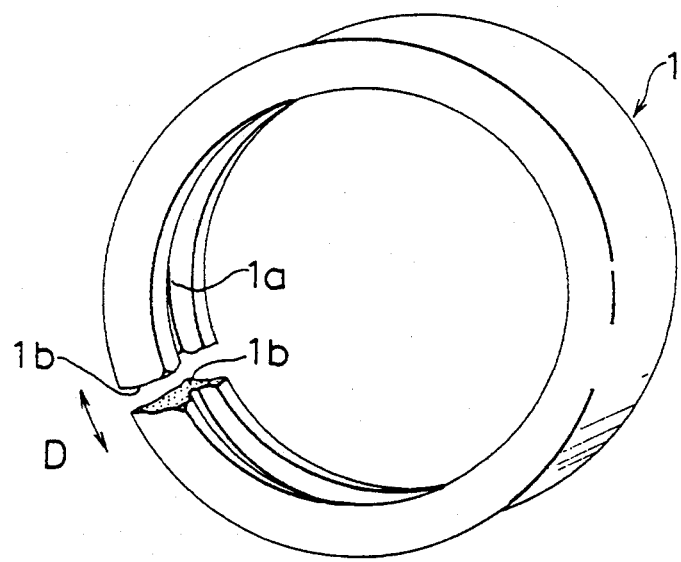
FIG. 4 is a perspective view of an outer ring equipped in the cross roller bearing shown in FIGS. 1 and 2.

Next, assembly of the bearing is performed by assembling outer ring 1 and inner ring 2, applying an external force to outer ring 1, spreading open said outer ring 1 at its split surfaces 1b, and incorporating rollers 3 and separators 4 (refer to FIG. 3). Coupling member 6 is then fit onto the above-mentioned groove 1e by removing the external force. Furthermore, incorporation of rollers 3 and separators 4 is performed by attaching a jig (not shown) to groove 1e on the outside of the split portion of outer ring 1 and spreading open split surfaces 1b of outer ring 1.

Figure 7:
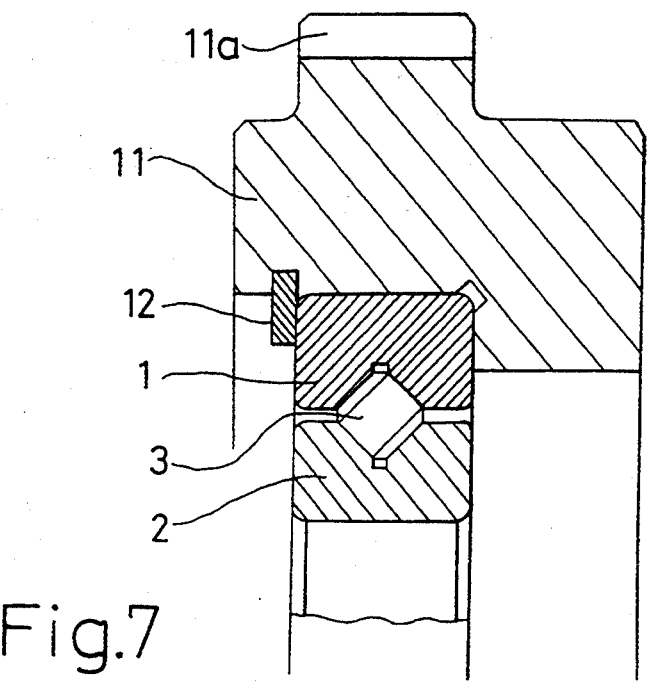
FIG. 7 is a vertical cross-sectional view showing the cross roller bearing claimed in the present invention incorporated in an apparatus.
Figure 8:
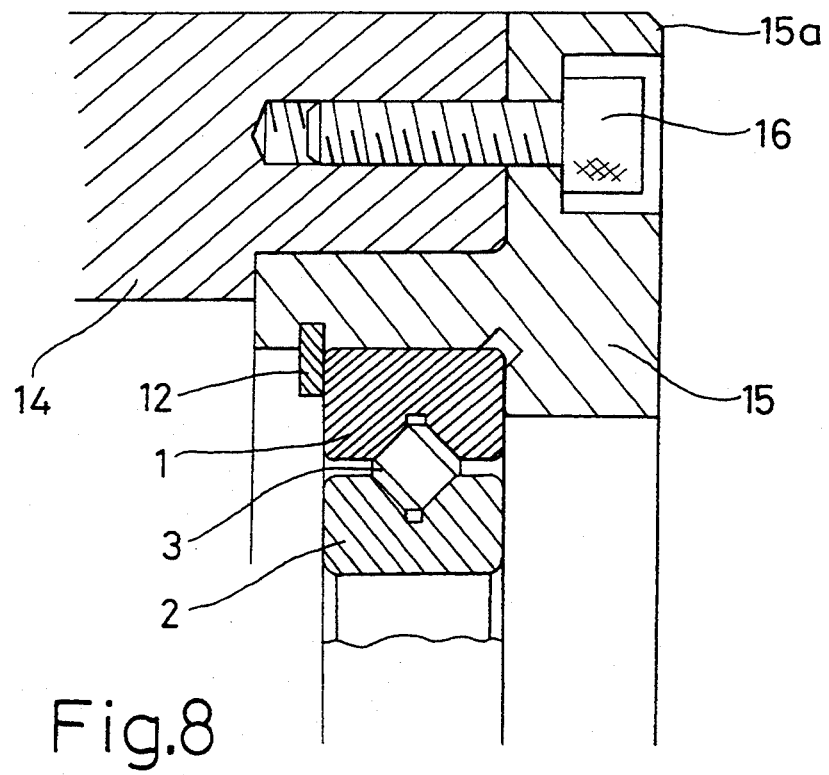
FIG. 8 is a vertical cross-sectional view showing the cross roller bearing claimed in the present invention incorporated in an apparatus.

FIGS. 7 and 8 respectively show specific examples of state in which the cross roller bearing having the above-mentioned constitution is incorporated into an apparatus.

In the example shown in FIG. 7, rotating member 11, in which gear piece 11a is formed in one solid piece on the outer surface to have a hollow shape, and outer ring 1 of the cross roller bearing is fit into this rotating member 11. Furthermore, in this drawing, reference numeral 12 indicates a retaining ring that serves to prevent the cross roller bearing from coming out of said housing 11.

In the other specific example shown in FIG. 8, the cross roller bearing is inserted within housing 15 fastened to casing 14 with bolt 16 at flange 15a.

FIGS. 9 through 13 show a second embodiment of the cross roller bearing of the present invention.

In each of these drawings, split surfaces 1b provided at one location in outer ring 1 are formed by forming a plurality of roughly V-shaped notches 1g on one side and the inner surface of outer ring 1, and applying a concentrated load to these notches 1g. In addition, said split surfaces 1b are perpendicular to the V-shaped grooves 1a of outer ring 1.

The following constitution is provided so that those portions split by the above-mentioned split surfaces 1b are coupled securely together so that a gap does not form between said split surfaces 1b.

Figure 9:
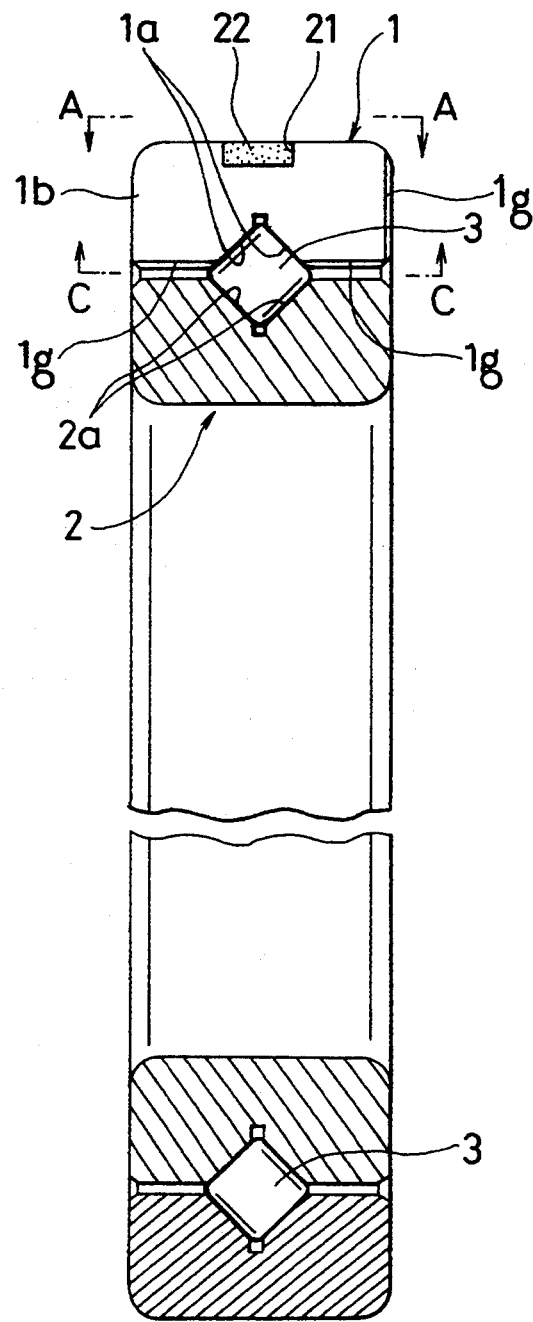
FIG. 9 is a vertical cross-sectional view of a cross roller bearing as a second embodiment of the present invention.
Figure 10:
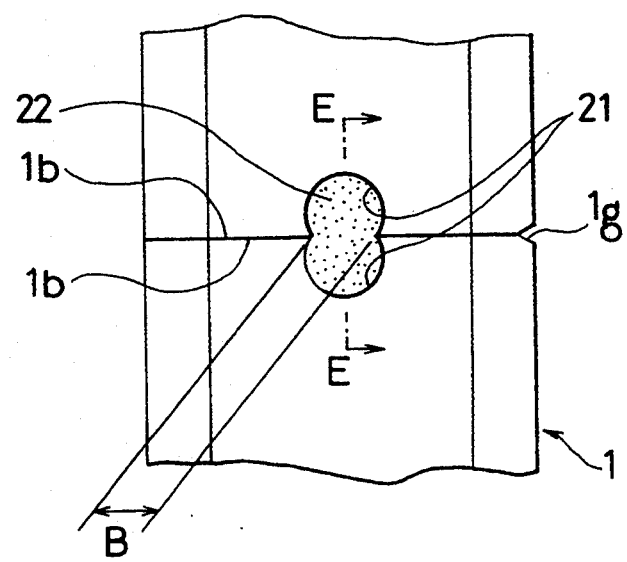
FIG. 10 is a drawing showing the portion viewed from arrows A—A with respect to FIG. 9.
Figure 11:
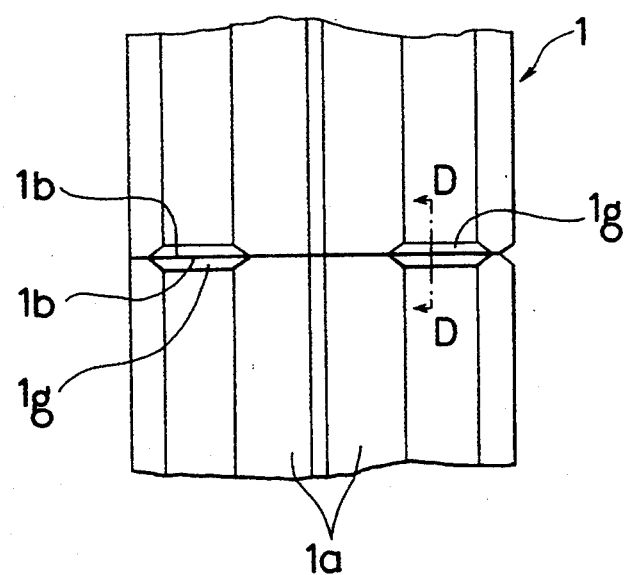
FIG. 11 is a drawing showing the portion viewed from arrows C—C with respect to FIG. 9.
Figure 12:
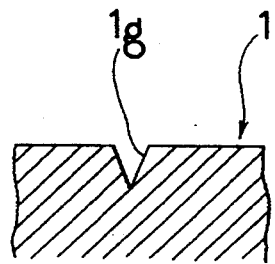
FIG. 12 is a drawing showing the portion viewed from arrows D—D with respect to FIG. 11.
Figure 13:
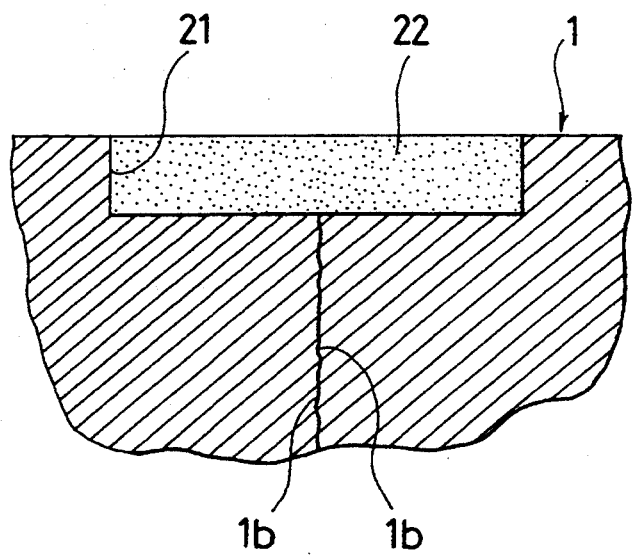
FIG. 13 is a drawing showing the portion viewed from arrows E—E with respect to FIG. 10.

As shown in FIGS. 9, 10 and 13, recess 21, extending so as to cross the above-mentioned split surfaces 1b at one location over the width of said split surfaces 1b, is formed in the outer surface of outer ring 1. Filling member 22 is then filled into said recess 21. Furthermore, synthetic resin and so forth is used for the material of said filling member 22. After melting said filling member 22 by heating and pouring it into recess 21, said filling member 22 is hardened by cooling. In addition, the surface of filling member 22 is set to be level with or below the outer surface of outer ring 1.

As is clear from FIG. 10, together with the above-mentioned recess 21 crossing split surfaces 1b at roughly its central portion, it is formed so that the width B of said crossing portion or portion near said crossing portion is narrower in comparison with the widths of other portions. As a result of said constitution, split surfaces 1b are securely joined together and will not separate unless filling member ruptures.

Furthermore, as shown in FIG. 10, although the shape of recess 21 is such that two circles having the same radius cross split surfaces 1b in the present embodiment, recess 21 is not limited to said shape, but rather, various other shapes can naturally also be employed.

Since the coupling device is simply composed by essentially only filling member 22 as described above, costs can be kept relatively low.

Furthermore, the material of filling member 22 is not limited to the synthetic resin as described above, but rather, sheet steel and so forth may be used by forming into a shape that can be tightly fit into recess 21 and then anchoring by brazing and so forth. However, this constitution is somewhat more bothersome in comparison with the above-mentioned constitution wherein this process is completed simply by pouring in synthetic resin.

Figure 14:
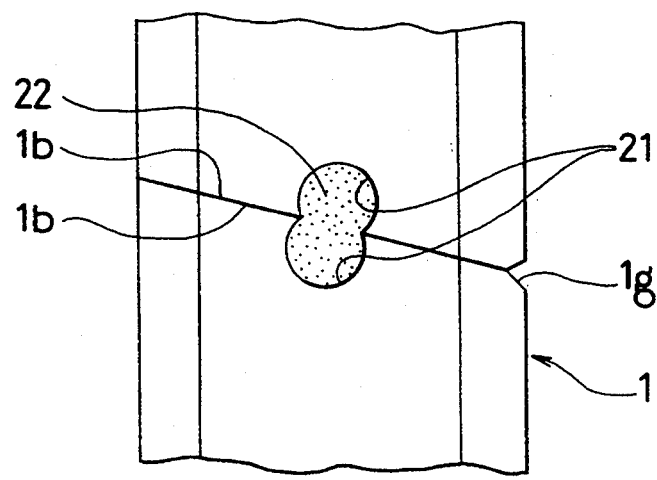
FIG. 14 is a drawing showing a portion of the outer ring equipped in a cross roller bearing as a third embodiment of the present invention as viewed from the outside.
Figure 15:
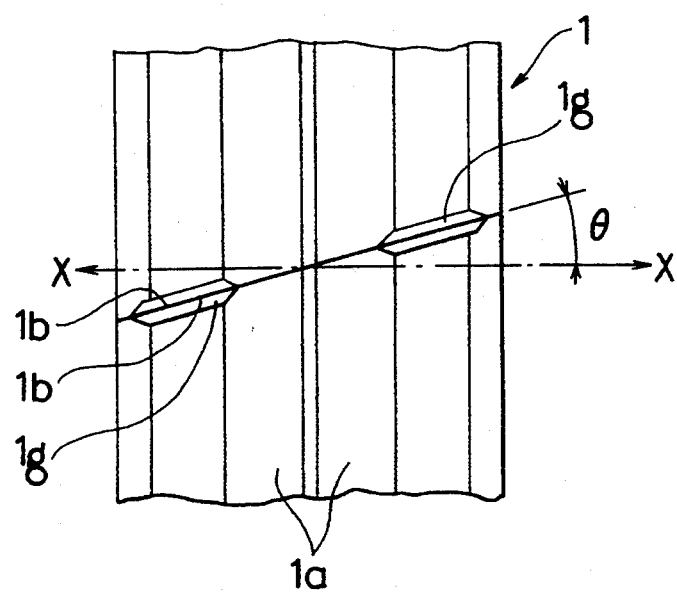
FIG. 15 is a drawing showing a portion of the outer ring equipped in a cross roller bearing as a third embodiment of the present invention as viewed from the inside.

FIGS. 14 and 15 show the essential portion of a third embodiment of the cross roller bearing of the present invention.

As shown in the drawings, in said cross roller bearing, split surfaces 1b of outer ring 1 are formed so as to cross direction X—X perpendicular to V-shaped groove 1a of said outer ring 1 at angle θ. This angle θ is preferably within a range of roughly from 10° to 20°, and an angle of, for example, 15° is particularly preferable.

In said constitution, rollers 3 roll while making point contact with the extremely minute gap formed between split surfaces 1b when rolling along the above-mentioned V-shaped groove 1a. The effects due to the split surfaces are thereby reduced in comparison with the state in which rollers 3 make line contact with said gap as in the cross roller bearing of the prior art.

According to the present invention as explained above, since a recess is formed in the outer surface of the outer ring corresponding to split surfaces, the preliminary pressure applied to the rollers is reduced at the portion at which this recess is formed. Together with this suppressing the wear of the rollers caused by the gap that forms between said split surfaces, this also secures a smooth rotating state, thus offering the advantage of achieving a long service life.

In addition, according to the present invention, the advantage is offered in which reduction of the effects of the split surfaces formed in the outer ring can be achieved, and thereby lengthen service life, at extremely low cost.

What is claimed is:

1. A cross roller bearing comprising:
   an outer ring and an inner ring each having a V-shaped circumferential groove, said outer ring having split surfaces extending in a direction crossing the V-shaped groove at one location and a recess formed in an outer surface of said outer ring at a location corresponding to the split surfaces;
   a plurality of rollers juxtaposed between the V-shaped grooves;
   a ring shaped groove formed in the outer surface of said outer ring, the ring shaped groove intersecting the split surfaces and having an inner circumferential wall and an outer circumferential wall; and
   a coupling member of at least roughly ring shape that fits into the ring-shaped groove and contacts one of said inner circumferential wall, said outer circumferential wall, and both inner and outer circumferential walls to secure the split surfaces of said outer ring together.

2. A cross roller bearing as recited in claim 1, wherein said coupling member is a resiliently deformed ring shaped member having an inner diameter which is smaller than a diameter of the inner circumferential wall of the ring-shaped groove so that when said resiliently deformed coupling member is inserted in said ring-shaped groove said coupling member exerts a force against the inner circumferential wall of the ring-shaped groove to secure the split surfaces of the outer ring together.

3. A cross roller bearing as recited in claim 2, wherein said coupling member is a steel spring.

4. A cross roller bearing as recited in claim 1, wherein said coupling member is a steel spring.

5. A cross roller bearing comprising:
   an outer ring and an inner ring each having a V-shaped circumferential groove, said outer ring having split surfaces extending in a direction crossing the V-shaped groove at one location and a recess formed in an outer surface of said outer ring at a location corresponding to the split surfaces;
   a plurality of rollers juxtaposed between the V-shaped grooves;

a first ring shaped groove formed in the outer surface of said outer ring, the first ring shaped groove intersecting the split surfaces and having an inner circumferential wall and an outer circumferential wall;

a second ring shaped groove extending along a circumference of the inner circumferential wall of the first ring shaped groove; and a coupling member of at least roughly ring shape that fits into the second ring-shaped groove to secure the split surfaces of said outer ring together.

6. A cross roller bearing as recited in claim 5, wherein said coupling member is a resiliently deformed member.

7. A cross roller bearing as recited in claim 6, wherein said coupling member is a steel spring.

* * * * *